United States Patent [19]
Yamashita

[11] Patent Number: 6,164,310
[45] Date of Patent: Dec. 26, 2000

[54] PRIORITY TYPE FLOW DIVIDING VALVE

[75] Inventor: Shigeru Yamashita, Shiga, Japan

[73] Assignee: Shimadzu Corporation, Kyoto, Japan

[21] Appl. No.: 09/327,554

[22] Filed: Jun. 8, 1999

[30] Foreign Application Priority Data

Jun. 22, 1998 [JP] Japan .................................. 10-174875

[51] Int. Cl.[7] ............................................... F16K 11/07
[52] U.S. Cl. ..................... 137/119.06; 137/101; 251/50
[58] Field of Search ..................... 137/119.01, 119.06, 137/119.08, 115.15, 101; 251/50, 51

[56] References Cited

U.S. PATENT DOCUMENTS

| | | | |
|---|---|---|---|
| 3,703,186 | 11/1972 | Brewer | 137/101 |
| 3,777,773 | 12/1973 | Tolbert | 137/115.15 |
| 3,939,859 | 2/1976 | Ueda et al. | 137/115.15 |
| 4,784,368 | 11/1988 | Kock et al. | 251/51 |
| 5,289,843 | 3/1994 | Smith | 137/115.15 |

*Primary Examiner*—Stephen M. Hepperle
*Attorney, Agent, or Firm*—Kanesaka & Takeuchi

[57] ABSTRACT

A priority type dividing valve includes a housing, a spool slidably situated inside the housing and having a damper orifice, and a damper chamber formed between the spool and the housing for providing a resistance to the movement of the spool. The damper orifice is changeable and includes a small hole and notches, by which the damping effect is changed. At the time of a steering operation, the notches do not operate to increase the damping effect to thereby provide the sufficient holding force to suppress the vibration. When the spool is moved, the notches are actuated to reduce the damping effect to reduce the dragging resistance. Thus, the quick response is obtained.

6 Claims, 7 Drawing Sheets

PRIORITY TYPE FLOW DIVIDING VALVE

BACKGROUND OF THE INVENTION AND RELATED ART STATEMENT

The present invention relates to a priority type flow dividing valve, which is suitable in utilizing a pressurized fluid of a common pressurized hydraulic source, for steering and loading controls in a forklift or the like.

For example, in a forklift or the like, a pressurized fluid from a single hydraulic source is divided by a flow dividing valve to obtain a predetermined amount of the fluid to be used primarily for steering, and at the same time, the rest of the fluid is used for loading. As described above, a valve which operates to obtain or secure a predetermined amount of fluid primarily for a special purpose, such as operating a steering, is called a priority type flow dividing valve.

A conventional priority type flow dividing valve is formed of a housing having a high pressure port, a steering port and a loading port; a spool slidably situated in the housing to lead a pressurized fluid in the high pressure port to the steering port through a control orifice and also to directly lead the fluid to the loading port; a spring capable of providing an elastic force to the spool in a direction opposite to a liquid pressure force which works on the spool in accordance with a differential pressure of the control orifice at the front and rear sides; a first throttle disposed between the spool and housing to open and close a path to the steering port in accordance with advancing and retreating movements of the spool; and a second throttle disposed between the spool and the housing and actuated oppositely relative to the first throttle in accordance with the advancing and retreating movements of the spool so as to open and close a path to the loading port. In the conventional priority type flow dividing valve, a predetermined amount of the pressurized fluid is primarily led to the steering port, and if necessary, a surplus flow or amount of the pressurized fluid is divided to flow to the loading port.

Namely, a priority flow called PF flow amount flows through the control orifice, but at this time, pressure difference occurs at the front and rear sides of the control orifice. The pressure difference allows the spool to move while it compresses a spring set at the predetermined spring characteristic in advance, but while balancing the first and second throttles disposed between the spool and the housing, the spool is finally held at a position such that the differential pressure and a spring force are balanced. The first throttle is a so-called PF throttle for opening and closing the path to the steering port, and the second throttle is a so-called MF throttle for opening and closing the path to the loading port.

The both throttles are switched in connection with high-low degree of the steering operation pressure and the loading operation pressure. When the steering pressure, i.e. pressure at the steering port, is high, the MF throttle functions, and when the loading operation pressure, i.e. pressure for the loading port, is high, the PF throttle functions, to thereby maintain the PF flow rate at the predetermined amount.

On the other hand, the control orifice, the PF throttle, the MF throttle and the spring constitute a feedback control system for controlling the spool, and the spool always has a vibration, called hunting. Especially, in the various kinds of hydraulic pressure control type steering systems, for which the flow dividing valve is used, a full hydraulic pressure type steering system is weak in strength in a vibration system, and is liable to be uncontrollable by oscillation or vibration. Thus, conventionally, a damper chamber, which enlarges or shrinks while the pressurized fluid in the high pressure port flows in or out through a damper orifice, is formed between the spool and the housing, and oscillation is prevented by utilizing the resistance through the damper orifice.

However, if the diameter of the damper orifice is reduced to prevent the oscillation, to raise a resistance against the pressure fluid and to increase a decrement suppressing effect, when switching between the loading condition functioned in the PF throttle and the steering condition functioned in the MF throttle is made, the resistance against the movement of the spool is increased to cause a time delay in the movement of the spool. Then, by the time delay, the switching between the steering condition and the loading condition is delayed, to cause an extremely bad effect to the steering operation, which is considered to be important especially in view of operability and safety.

In case a forklift is referred to as an example described above, when the diameter of the damper orifice is enlarged to move the spool smoothly, the differential pressure between the front and rear of the orifice, i.e. resistance against the pressurized fluid, is reduced, so that the oscillation in the steering system is likely to occur to fall into an inoperable condition. On the other hand, when the diameter of the damper orifice is reduced, at the time of changing to or from the steering operation condition, the movement of the spool is delayed to cause an action by the pressure, so that there might be a problem such that a phenomena, such as an impact or kickback to the handle, occurs.

In order to solve the aforementioned problems, an object of the present invention is to provide a priority type flow dividing valve which can be operated safely in any conditions.

Another object of the invention is to provide a priority type flow dividing valve as stated above, wherein the valve condition can be switch smoothly.

Further objects and advantages of the invention will be apparent from the following description of the invention.

SUMMARY OF THE INVENTION

A priority type dividing valve of the present invention comprises a housing having a high pressure port, a steering port and a loading port, a predetermined amount of a pressurized fluid in the high pressure port being primarily supplied to the steering port and a rest of the pressurized fluid being divided and supplied to the loading port as required; a spool slidably situated inside the housing and having a control orifice and a damper orifice, the spool leading the pressurized fluid in the high pressure port to the steering port through the control orifice and directly to the loading port; and a spring situated inside the housing and providing a spring force to the spool in a direction opposite to a direction of a fluid pressure force acting on the spool according to a differential pressure between front and rear sides of the control orifice. A first throttle is situated between the housing and the spool for opening and closing a path to the steering port according to a movement of the spool, and a second throttle is situated between the housing and the spool for opening and closing a path to the loading port. The second throttle operates in a manner opposite to the first throttle according to a movement of the spool. Also, a damper chamber is formed between the spool and the housing for providing a resistance to the movement of the spool. The size of the damper chamber is changed by allowing the pressurized fluid in the high pressure port to flow in and out thereto through the damper orifice.

In the invention, the damper orifice is changeable. Namely, the damper orifice has a maximum throttle amount at a predetermined position when the spool is moved in the direction of opening the first throttle and closing the second throttle upon actuation of a pressure to the steering port. A throttle amount of the damper orifice is gradually reduced when the spool is moved from the predetermined position in the direction of closing the first throttle and opening the second throttle.

In this structure, since the damper orifice can provide the vibration suppressing effect sufficiently, during the movement of the spool, the damper operation is reduced to thereby reduce the resistance applied to the spool. Thus, the spool can be moved to and from the MF throttle position quickly. Also, in the MF throttle position, the damper operation is high, and the sufficient resistance is applied to the spool, so that the damper effect sufficient to suppress the vibration is obtained.

DETAILED DESCRIPTION OF PREFERRED EMBODIMENTS

Hereinafter, an embodiment of the invention is explained with reference to the attached drawings.

Figure 1:
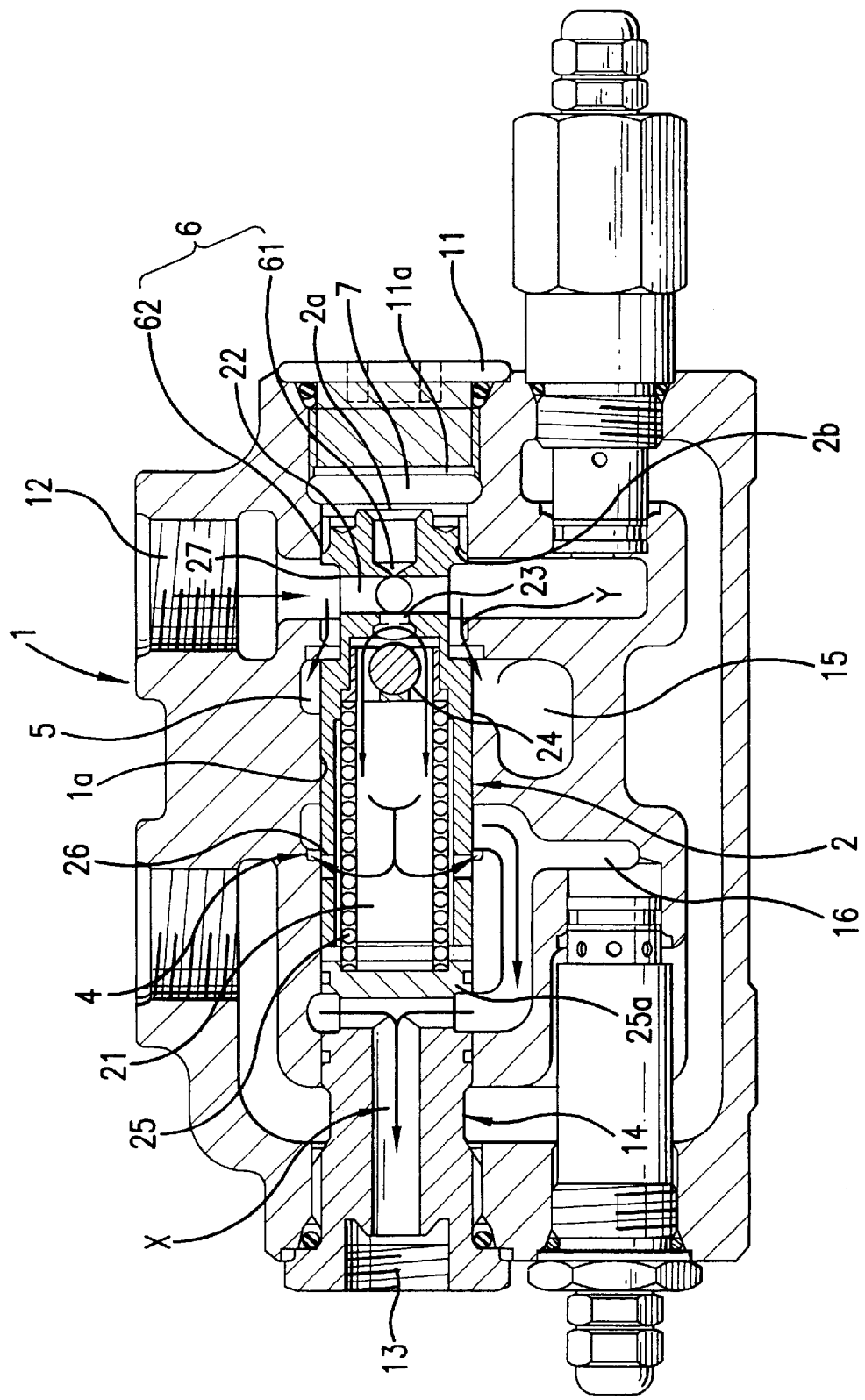
FIG. 1 is a sectional view showing an embodiment of the present invention.

A priority type flow dividing valve of the embodiment is, for example, applied to a forklift, and is provided to divide a pressurized fluid, such as oil, from a common hydraulic source for primarily providing to a steering, and the remaining fluid is supplied for a loading control according to a requirement. As shown in FIG. 1, the priority type flow dividing valve includes a spool 2 and a spring 25 in a housing 1.

The housing 1 includes a spool holding or retaining hole 1a, and is closed by a lid member 11 at an end thereof in a condition that the spool 2 is inserted into the spool holding hole 1a. In the housing 1, a high pressure port 12 is disposed at one side of the spool holding hole 1a, and a steering port 13 is disposed at the other end of the spool holding hole 1a through a priority connector 14. Also, inside a wall portion of the housing 1, a loading port 15 is disposed adjacent to the high pressure port 12, and there is disposed an inner flow path 16 wherein one end thereof is opened in an inner periphery around a center of the spool holding hole 1a and the other end communicates with the steering port 13.

On the other hand, the spool has a cylindrical shape having a hollow portion 21 at a base side, and is provided with a vertical hole 22 at a front side. The vertical hole 22 and the hollow portion 21 are communicated with each other through a control orifice 23 and a load check valve 24 disposed at a boundary between the vertical hole 22 and the hollow portion 21. In the hollow portion 21, a spring 25 for urging the spool 2 to one side relative to a spring retainer 25a disposed inside the spool holding hole 1a. A vertical hole 26 is formed around the outer periphery near the rear end of the spool, so that the pressurized liquid is introduced into one end of the inner flow path 16 through the vertical hole 22, control orifice 23, load check valve 24, hollow portion 21 and vertical hole 26. Also, a circular groove 27 is formed around the outer periphery near the front side of the spool 2, so that the pressurized liquid of the high pressure port 12 can be directly introduced into the loading port 15 through the circular groove 27.

For introducing the pressurized liquid, there are provided, between the spool 2 and the housing 1, a PF throttle 4 as a first throttle for reducing the flow amount of the pressurized fluid to the steering port 13 and a MF throttle 5 for reducing the flow amount of the pressurized fluid to the loading port 15. The PF throttle 4 is opened when the spool 2 is located at the right moving side shown in FIG. 2, and is closed at the left moving side shown in FIG. 1. As shown in FIG. 3, between the open and closed positions, the PF throttle 4 changes relatively proportionally an open area, which becomes a path to the steering port 13. Also, the MF throttle 5 is closed when the spool 2 is located at the right moving side, and is opened at the left moving side. Between the open and closed positions, the MF throttle 5 changes relatively proportionally an open area, which becomes a path for the loading port 15. Namely, the throttles 4, 5 are set reversely with respect to each other to increase or decrease the open area for the path to the steering port 13 and the open area for the path to the loading port 15.

Here, the basic operation of the priority type dividing valve is explained. The pressurized fluid, such as oil, entering from the high pressure port 12 flows to the steering port 13 through the control orifice 23, load check valve 24 and PF throttle 4 inside the spool 2.

In case the supply amount of the fluid from the high pressure port 12 is increased by some reason, a differential pressure occurs between the front and rear of the control orifice 23, but since both ends of the spool 2 receive pressures at the front and rear of the control orifice 23, the spool 2 moves to a direction for closing the PF throttle 4, i.e. left direction, due to the generation of the differential pressure or pressure difference. Accordingly, the priority flow X is reduced to thereby reduce the pressure difference. Through the operation as stated above, the priority flow amount is set by the control orifice 23 and the set spring 25 to the predetermined amount.

Also, at the time of the steering operation, the pressure at the priority flow X increases to thereby increase the whole pressure. Since the pressure at a side of an extra or surplus flow Y is low, it operates to flow a large amount of the pressurized fluid. As a result, the flow amount at the control orifice 23 is reduced to thereby reduce the front and rear pressure difference, so that the spool 2 is moved to the direction for closing the MF throttle 5, i.e. right direction. As a result, the front and rear pressure difference of the control orifice 23 is kept constant to retain or provide a constant flow amount for the priority flow X.

Further, at the time of the loading operation, the extra flow Y is increased to thereby increase the whole pressure. At this time, since the priority flow X is low in pressure than the extra flow Y, the flow amount of the priority flow X tries to increase. However, as the priority flow amount increases, the front and rear pressure difference relative to the control orifice 23 increases, so that the flow amount of the priority flow X is kept constant by the PF throttle 4.

As stated above, the priority type dividing valve in the embodiment can operate to primarily provide the predetermined amount of the priority flow X to the steering port 13 while dividing the flow and providing the extra flow Y to the loading port 15 as required.

On the other hand, the control orifice 23, PF throttle 4, MF throttle 5 and spring 25 form a feedback control system for controlling the spool 2. Also, vibration called hunting occurs in the spool 2.

Thus, a damper chamber 7 is formed between the spool 2 and the housing 1. The damper chamber 7 expands and contracts while allowing the pressurized fluid of the high pressure port 12 through the damper orifice 6 to flow in and out.

In particular, the damper chamber 7 is formed at a position closed or surrounded by a front surface 2a of the spool 2, an inner peripheral surface of the spool holding hole 1a and an inner surface 11a of the lid member 11.

Figure 4:
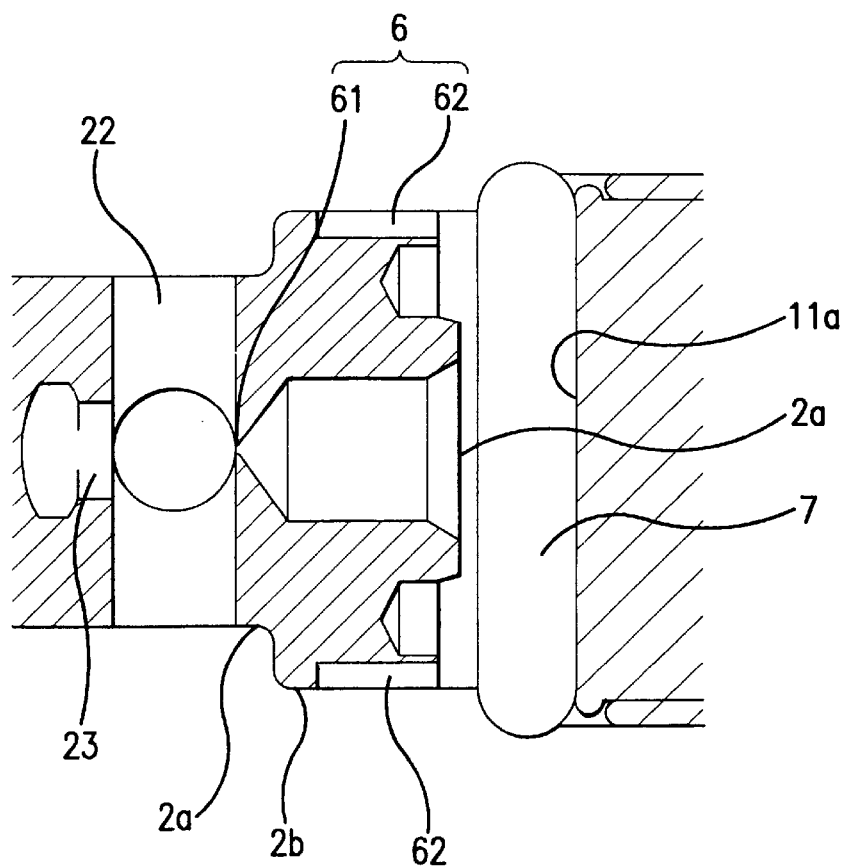
FIG. 4 is an enlarged view of a main part of FIG. 1.

As shown in the enlarged view in FIG. 4, the damper orifice 6 is provided with a small hole 61 formed at a position communicating between the front surface 2a of the spool 2 and an inner portion of the vertical hole 22, and notches 62, for example four, formed at the periphery of the front side of the spool 2 angularly equally spaced apart from each other. The diameter of the small hole 61 is selected to provide a sufficient vibration suppressing effect for the spool 2 due to the flow resistance at the time of flowing of the pressurized fluid at the high pressure port 12 with respect to the damper chamber 7.

On the other hand, the notch 62 may have various shapes. The notches 62 are formed around an outer peripheral land portion 2b at the front side of the spool 2 to open toward the damper chamber 7 at the respective tips thereof. When the spool 2 is located at the right moving side in FIG. 2, the notches 62 shut off the communication between the damper chamber 7 and the high pressure port 12, and when the spool 2 is moved for a predetermined distance from that position to the left moving side, as shown in FIG. 1, the damper chamber 7 and the high pressure port 12 can communicate through the notches 62.

Figure 5:
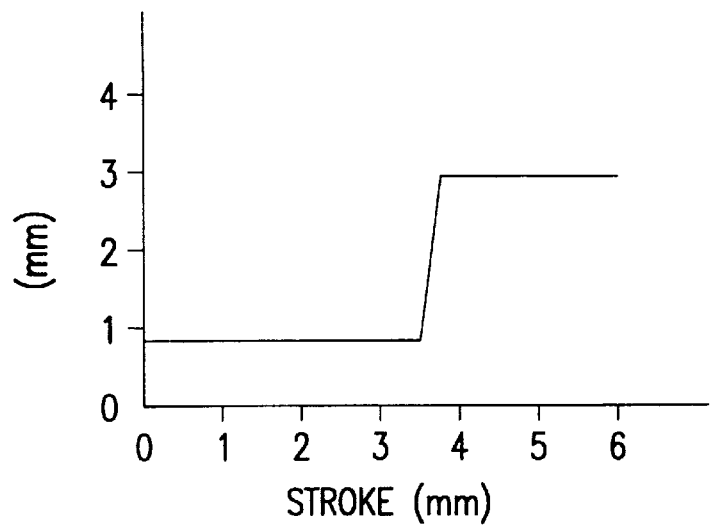
FIG. 5 is a graph showing a characteristic of a damper orifice of the embodiment.

Namely, when the spool 2 is in the left moving position while operating the PF throttle 4, the pressurized fluid from the high pressure port 12 passes through the small hole 61 of the damper orifice 6 and additionally through the notches. When the spool 2 is in the right moving position while operating the MF throttle 5, the pressurized fluid only passes through the small hole 61 of the damper orifice 6, not passing through the notches 62. FIG. 5 shows the change of all the damper orifice diameters including the small hole 61 and the notches 62 when the spool 2 located at the right moving position as shown in FIG. 2 starts to move to the left.

Next, the priority type dividing valve of the embodiment is explained. For example, when the spool 2 is located in the left moving position as shown in FIG. 1, the PF throttle 4 is operated, and the loading operation is performed. At this time, a predetermined amount of the priority flow is obtained at the steering port 13. After the loading operation is completed, the spool 2 tries to move from the position shown in FIG. 1 to the right moving position shown in FIG. 2, wherein the MF throttle 5 is operated. At this time, in the damper orifice 6, since the small hole 61 and the notches 62 communicate with the high pressure port 12, the flow resistance of the pressurized fluid flowing into and out of the damper chamber 7 is low and the moving speed of the spool 2 is fast. Therefore, the moving time until the spool 2 reaches the right moving position for the steering operation shown in FIG. 2 is shortened, so that the shock to the steering due to an insufficient amount of the pressurized fluid is suppressed.

Figure 2:
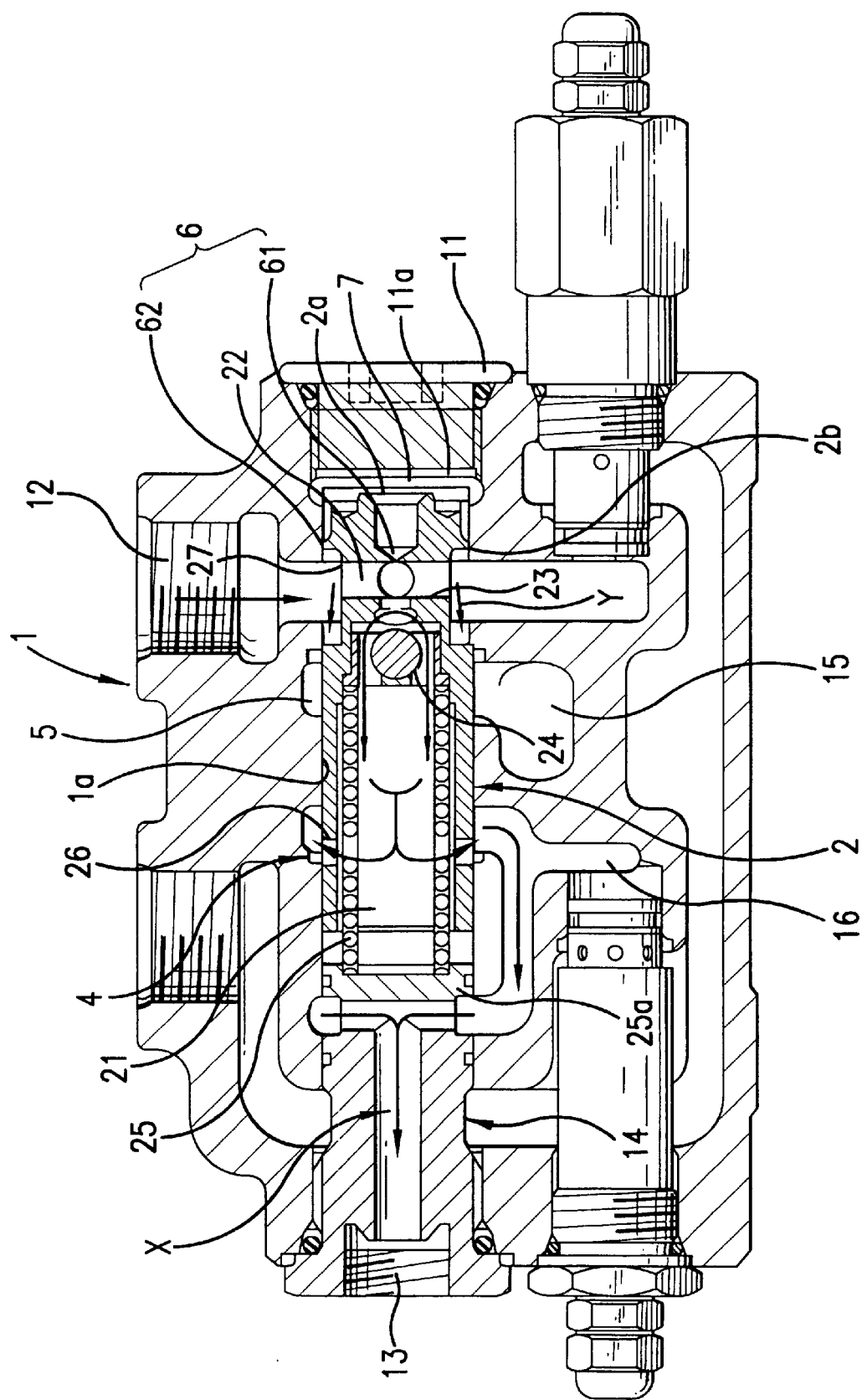
FIG. 2 is an explanatory sectional view corresponding to FIG. 1.
Figure 3:
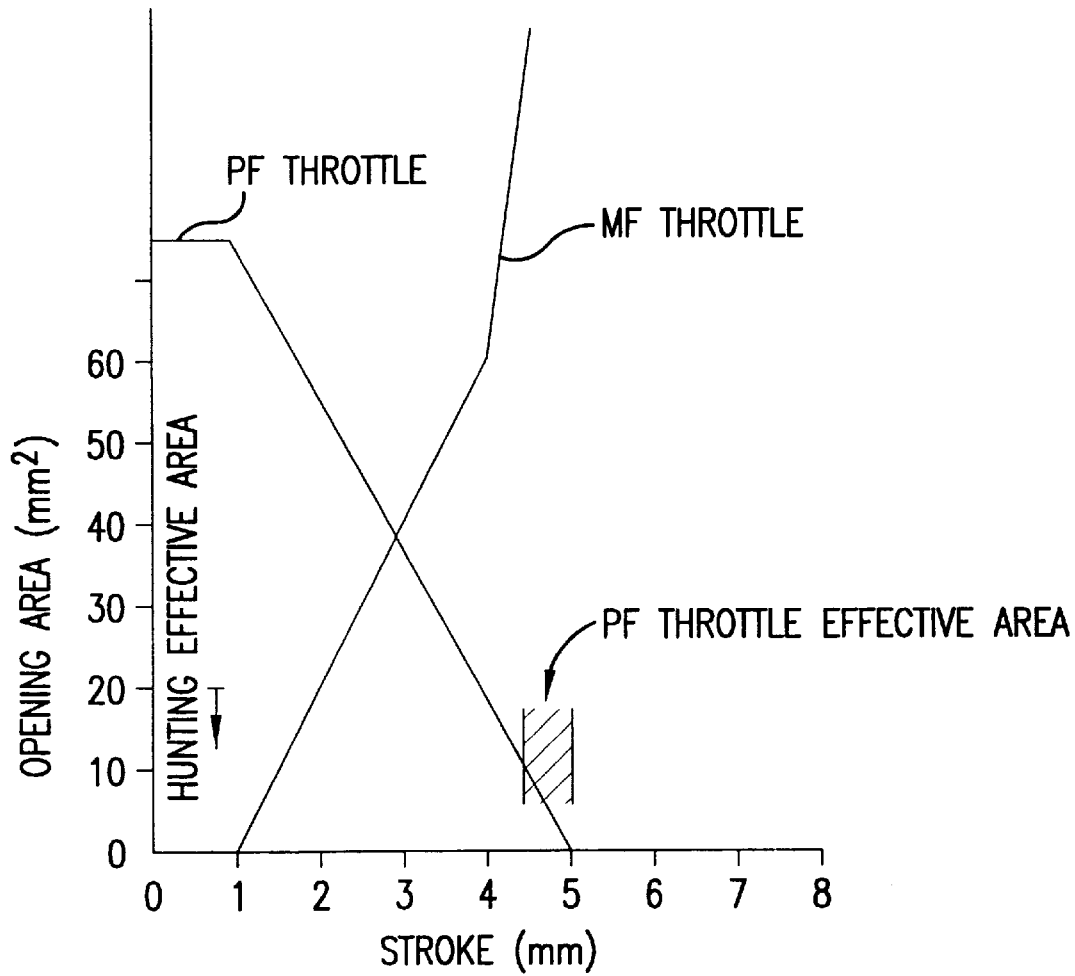
FIG. 3 is a graph showing a throttle characteristic of the embodiment.

After the spool 2 is moved to the position shown in FIG. 2, since the pressurized fluid can pass only through the small hole 61 of the damper orifice 6, the flow resistance of the pressurized fluid is high to restrict the movement of the spool, resulting in the suppression of the oscillation or vibration to the steering.

As explained above, in the embodiment of the invention, in order that the damper function of the spool 2 is relieved during the movement thereof and the dragging resistance of the spool 2 is minimized, it is possible to quickly move the spool 2 to the right moving position where the MF throttle 5 operates or to allow the spool 2 to leave from the right moving position. Also, since the small hole 61 is made small sufficiently, the damper operation at the right moving position is high to provide the sufficient resistance to the spool 2. Thus, it is possible to provide the sufficient damper effect to suppress the vibration.

Accordingly, when the valve is applied to the forklift and so on, it is possible to operate the steering stably through the stabilization of the spool 2. Also, it is possible to effectively suppress the kick back phenomena of the steering wheel through the smooth action of the spool when the operation is changed from the loading operation to the steering operation or from the steering operation to the loading operation.

Figure 6A:
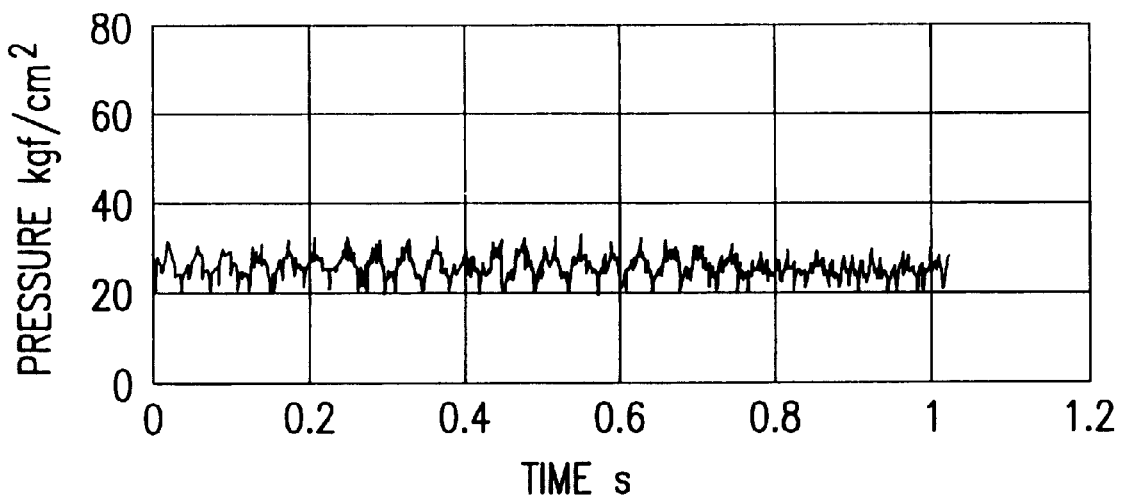
FIGS. 6(a) and 6(b) are graphs showing operation characteristics of the embodiment.
Figure 6B:
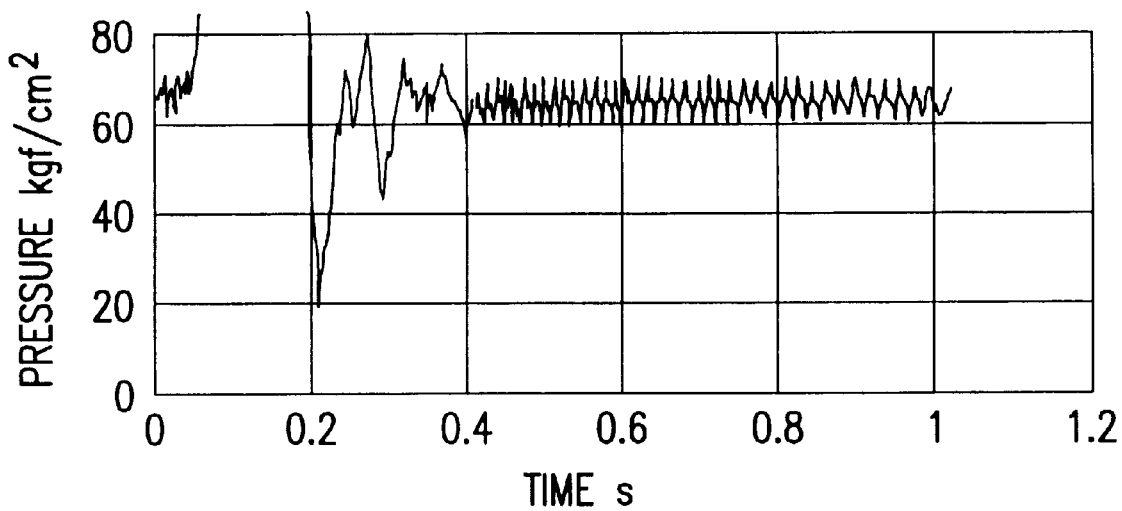
Figure 7A:
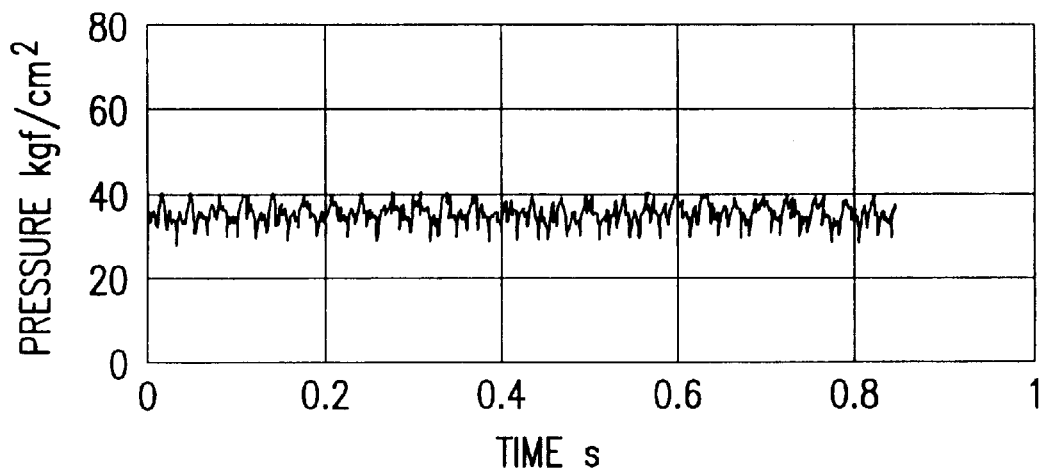
FIGS. 7(a) and 7(b) are graphs showing operation characteristics in a conventional structure comparing to the embodiment of the present invention.
Figure 7B:
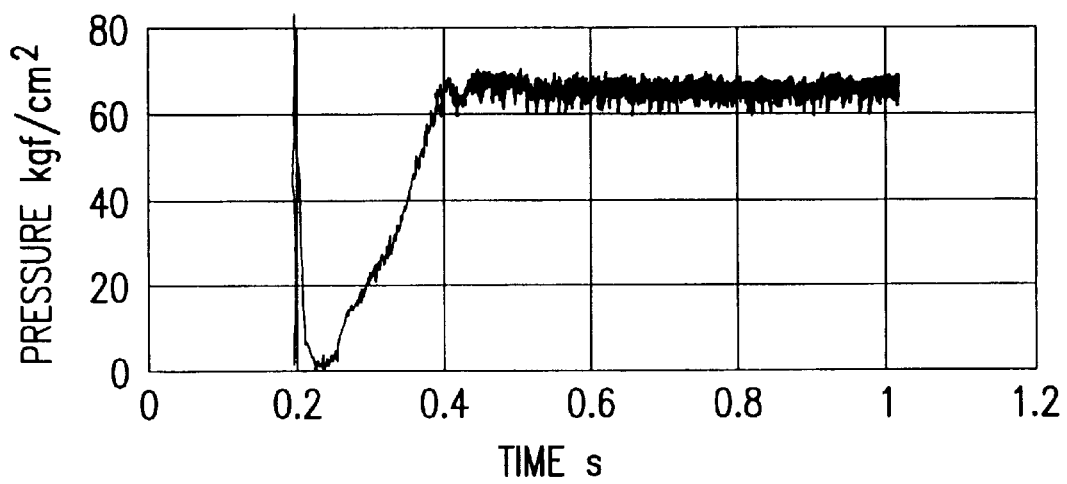
Figure 8A:
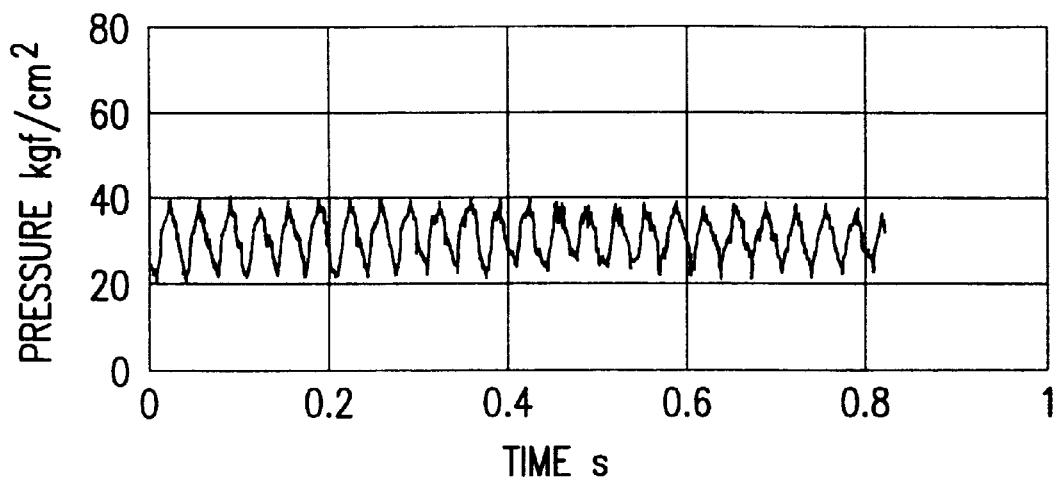
FIGS. 8(a) and 8(b) are graphs showing operation characteristics in other conventional structure comparing to the embodiment of the present invention.
Figure 8B:
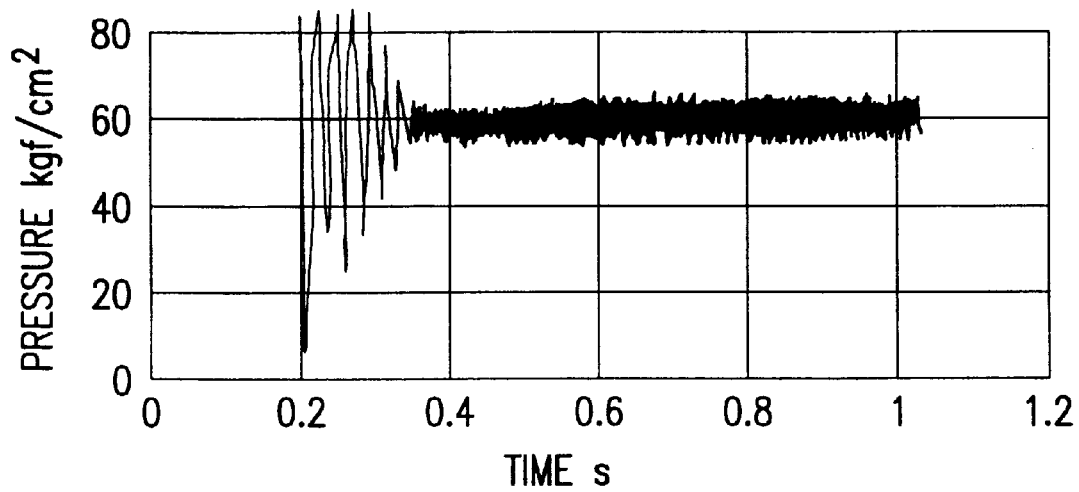

FIG. 6(a) shows the change of the pressure at the steering port 13, which causes the vibration of the spool 2 at the time of steering operation, and FIG. 6(b) shows the kick back received by the steering wheel when the operating condition is changed from the steering operation to the loading operation. In order to compare these figures, the measuring results in case the orifice diameter is made extremely small in the damper orifice 6 having only the small hole 61 are shown in FIGS. 7(a) and 7(b). As apparent from these drawings, it is clear that if the orifice diameter is made small, the vibration becomes small, but the response time delays extremely. In the damper orifice 6 having only the small hole 61, it is clear that if the orifice diameter is enlarged, the response becomes relatively fast, but the vibration width becomes large, as shown in FIGS. 8(a) and 8(b). In the invention, it is possible to effectively solve the problems of response and stability of the spool 2, which contradict to each other.

Incidentally, the actual structure is not limited to the embodiment shown in the drawings, and it is possible to modify the structure within the scope of the present invention. For example, in the above embodiment, the damper function is changed by utilizing the notches, but it is possible to make modified examples such that the orifice diameter is changed by, other than the notches, for example inserting a cone shape projection projecting from the housing into the small hole as the spool is moved, or the notches are formed at the housing side.

As explained above, while the diameter of the damper orifice is left as it is, i.e. without changing, the damper effect is changed in two steps by the means, such as forming the notches on the spool. As a result, at the time of the steering operation, the damper effect is effectively performed to act on the spool with a holding force. When the spool is moved, for example to change from the completion of the loading operation to the steering operation, the damper effect is reduced to quickly move the spool by reducing the dragging resistance of the spool. Thus, it is possible to effectively reduce the impact to the steering side due to the delay of the movement of the spool.

Thus, in the invention, it is possible to optimally balance the safety at the time of the steering operation and quick switching characteristic between the operation conditions by effectively actuating a damper function when the spool is at the steering operation position, and by reducing the damper function in the position other than the steering operation position.

While the invention has been explained with reference to the specific embodiments of the invention, the explanation is illustrative and the invention is limited only by the appended claims.

What is claimed is:

1. A priority type dividing valve, comprising:

a housing having a high pressure port, a steering port and a loading port, a predetermined amount of a pressurized fluid in the high pressure port being primarily supplied to the steering port and a rest of the pressurized fluid being divided and supplied to the loading port as required, a spool slidably situated inside the housing and having a control orifice and a damper orifice, said spool leading the pressurized fluid in the high pressure port to the steering port through the control orifice and directly to the loading port, a spring situated inside the housing and providing a spring force to the spool in a direction opposite to a direction of a fluid pressure force acting on the spool according to a differential pressure between front and rear sides of the control orifice, a first throttle situated between the housing and the spool for opening and closing a path to the steering port according to a movement of the spool, a second throttle situated between the housing and the spool for opening and closing a path to the loading port, said second throttle operating in a manner opposite to the first throttle according to a movement of the spool, and a damper chamber formed between the spool and the housing for providing a resistance to the movement of the spool, a size of said damper chamber being changed by allowing the pressurized fluid in the high pressure port to flow in and out thereto through the damper orifice, wherein said damper orifice is changeable type such that the damper orifice has a maximum throttle amount at a predetermined position when the spool is moved in a direction of opening the first throttle and closing the second throttle upon actuation of a pressure to the steering port, and a throttle amount of the damper orifice is gradually reduced when the spool is moved from said predetermined position in a direction of closing the first throttle and opening the second throttle.

2. A priority type dividing valve according to claim 1, wherein said spool has a vertical hole communicating with the high pressure port, said damper orifice being located at a side of the damper chamber relative to the vertical hole, and said control orifice being located at a side of the steering port relative to the vertical hole.

3. A priority type dividing valve according to claim 2, wherein said damper orifice includes a damper hole communicating between the vertical hole and the damper chamber, and notches communicating with the damper chamber, areas of the notches communicating with the high pressure port being changed upon movement of the spool to form the throttle amount of the damper orifice.

4. A priority type dividing valve according to claim 3, wherein said notches are formed in an outer periphery of the spool.

5. A priority type dividing valve according to claim 2, wherein said housing includes a peripheral groove for directly providing the pressurized fluid at the high pressure port to the loading port.

6. A priority type dividing valve according to claim 5, wherein said spool further includes a load check valve situated adjacent to the control orifice, and a second vertical hole at a side near the steering port to form the first throttle.

* * * * *